(12) United States Patent
Yoshida et al.

(10) Patent No.: US 9,798,963 B2
(45) Date of Patent: Oct. 24, 2017

(54) IMAGE FORMING SYSTEM THAT REDUCES LOAD FOR PROCESSING REGARDING CORRECTION OF PRINT POSITION DISPLACEMENT, AND METHOD FOR CORRECTING PRINT POSITION DISPLACEMENT (71) Applicant: Kyocera Document Solutions Inc., Osaka (JP)

(72) Inventors: Daisuke Yoshida, Osaka (JP); Takeshi Nakamura, Osaka (JP); Toyoaki Oku, Osaka (JP); Ryuichi Ishizu, Osaka (JP); Ryosuke Mondo, Osaka (JP); Atsushi Matsumoto, Osaka (JP); Katsuhiro Minoru, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/253,848

(22) Filed: Aug. 31, 2016

(65) Prior Publication Data

US 2017/0061263 A1 Mar. 2, 2017

(30) Foreign Application Priority Data

Aug. 31, 2015 (JP) .................................. 2015-170495

(51) Int. Cl.
*G06K 15/02* (2006.01)
*H04N 1/00* (2006.01)
(52) U.S. Cl.
CPC ....... *G06K 15/1867* (2013.01); *H04N 1/0009* (2013.01); *H04N 1/00013* (2013.01); *H04N 1/00015* (2013.01); *H04N 1/00029* (2013.01); *H04N 1/00034* (2013.01); *H04N 1/00061* (2013.01); *H04N 1/00244* (2013.01); *H04N 1/00323* (2013.01); *H04N 2201/0094* (2013.01)

(58) Field of Classification Search
None
See application file for complete search history.

(56) References Cited

U.S. PATENT DOCUMENTS

2004/0252391 A1* 12/2004 Azumai ............. H04N 1/00236
359/896
2006/0039606 A1* 2/2006 Miyatake ........... G06K 9/00449
382/189

FOREIGN PATENT DOCUMENTS

JP 2004-345325 12/2004

* cited by examiner

*Primary Examiner* — Andrew H Lam
(74) *Attorney, Agent, or Firm* — James Judge (57) ABSTRACT

An image forming system includes an image forming apparatus and a server. The image forming apparatus transmits to the server image data representing an image. The image is read by the reading device from the recording medium on which the print device prints the image, in response to an instruction to print at the origin of the print area. The server acquires, from the image data transmitted from the image forming apparatus, a printing-complete reference position, as a position where the recording-medium origin is made a reference, in a location printed on the recording medium by the image forming apparatus in response to an instruction to execute printing at the print-area origin, and acquires the displacement as a difference between the acquired printing-complete reference position and the print reference position stored in the storage device.

10 Claims, 9 Drawing Sheets

IMAGE FORMING SYSTEM THAT REDUCES LOAD FOR PROCESSING REGARDING CORRECTION OF PRINT POSITION DISPLACEMENT, AND METHOD FOR CORRECTING PRINT POSITION DISPLACEMENT

INCORPORATION BY REFERENCE

This application is based upon, and claims the benefit of priority from, corresponding Japanese Patent Application No. 2015-170495 filed in the Japan Patent Office on Aug. 31, 2015, the entire contents of which are incorporated herein by reference.

BACKGROUND

Unless otherwise indicated herein, the description in this section is not prior art to the claims in this application and is not admitted to be prior art by inclusion in this section.

There is known a following method for an image forming apparatus including a print device and a reading device as a typical print position displacement correction method for correcting a print position displacement of the image forming apparatus. The print device prints on a recording medium. The reading device reads an image from the recording medium. This correcting method corrects a print position displacement after the print device prints on the recording medium, obtains a print position displacement on the basis of the image read from the recording medium, on which printing is executed by the print device, by the reading device, and corrects the print position displacement on the basis of the obtained print position displacement.

SUMMARY

An image forming system according to an aspect of the disclosure includes an image forming apparatus and a server. The image forming apparatus includes a print device, a reading device, and a storage device. The print device prints on a recording medium. The reading device reads image from the recording medium. The storage device stores a print reference position as an origin of a print area with respect to a recording-medium origin on a recording medium on which the print device prints. The image forming apparatus causes the print device to execute printing with respect to the print reference position stored in the storage device. The server corrects displacement in image-forming-apparatus print position. The image forming apparatus transmits to the server image data representing an image. The image is read by the reading device from the recording medium on which the print device prints the image, in response to an instruction to print at the origin of the print area. The server acquires, from the image data transmitted from the image forming apparatus, a printing-complete reference position, as a position where the recording-medium origin is made a reference, in a location printed on the recording medium by the image forming apparatus in response to an instruction to execute printing at the print-area origin, and acquires the displacement as a difference between the acquired printing-complete reference position and the print reference position stored in the storage device. The image forming apparatus causes the storage device to store a new print reference position corrected based on the displacement.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes an embodiment of the disclosure with reference to the drawings.

First, the following describes a configuration of an image forming system according to the embodiment.

Figure 1:
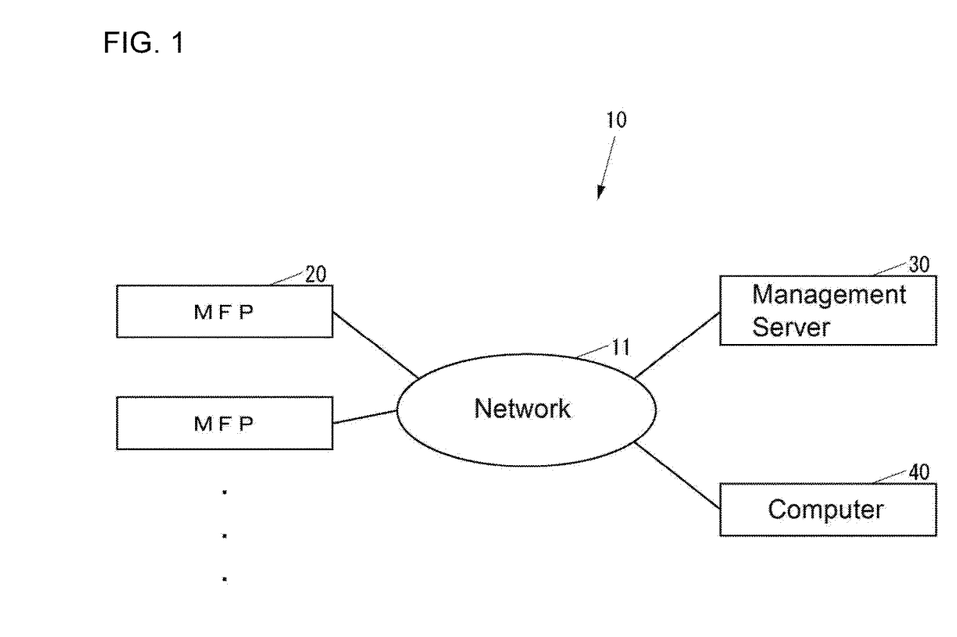
FIG. 1 illustrates an image forming system according to an embodiment of the disclosure.

FIG. 1 illustrates an image forming system 10 according to the embodiment.

As illustrated in FIG. 1, the image forming system 10 includes a plurality of MFPs including a multifunction peripheral (MFP) 20, a management server 30, and a computer 40. The plurality of the MFPs including the MFP 20 are image forming apparatuses that print on a recording medium, such as paper sheet. The management server 30 manages the plurality of the MFPs included in the image forming system 10. The computer 40 is used by an administrator who manages the plurality of the MFPs included in the image forming system 10.

The plurality of the MFPs included in the image forming system 10 and the management server 30 are communicatively connected one another via a network 11, such as a local area network (LAN) or the Internet. The management server 30 and the computer 40 are similarly and communicatively connected one another via the network 11.

The MFPs other than the MFP 20 among the plurality of the MFPs included in the image forming system 10 have a configuration similar to a configuration of the MFP 20. Thus, the MFPs will not be further elaborated here.

Figure 2:
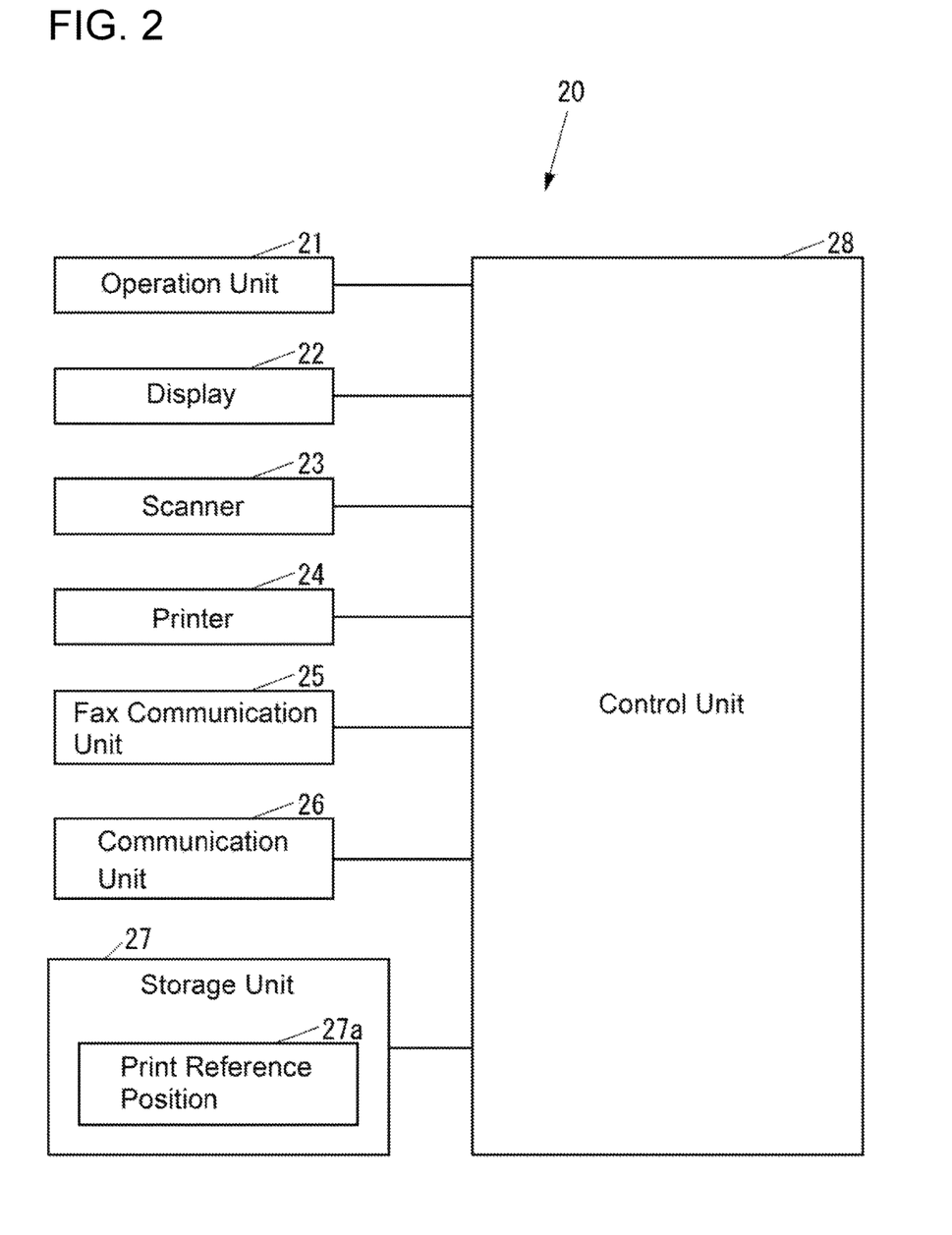
FIG. 2 illustrates an MFP according to the embodiment.

FIG. 2 illustrates the MFP 20.

The MFP 20 includes an operation unit 21, a display 22, a scanner 23, a printer 24, a fax communication unit 25, a communication unit 26, a storage unit 27, and a control unit 28 as illustrated in FIG. 2. The operation unit 21 is an input device such as, a button, with which a user inputs various operations. The display 22 is a display device such as, a liquid crystal display (LCD), which displays various pieces of information. The scanner 23 is a reading device that reads an image from a document. The printer 24 is a print device that executes printing on a recording medium such as paper sheet. The fax communication unit 25 is a fax device that performs fax communications with an external facsimile device (not illustrated) via a communication line such as a dial-up line. The communication unit 26 is a network communication device that communicates with an external device via the network 11 (see FIG. 1). The storage unit 27 is a non-volatile storage device, which stores various information, such as a semiconductor memory or a hard disk drive (HDD). The control unit 28 controls the whole MFP 20.

The storage unit 27 stores a print reference position 27a as an origin of a print area printed by the printer 24 in the recording medium. The print reference position 27a is a position with respect to an origin of the recording medium. Here, the print area is the maximum area printable on the recording medium for the printer 24.

The control unit 28 includes, for example, a central processing unit (CPU), a read only memory (ROM), and a random access memory (RAM). The ROM stores programs and various data. The RAM is used as a work area of the CPU in the control unit 28 itself. The CPU in the control unit 28 executes programs stored in the storage unit 27 or the ROM in the control unit 28.

The control unit 28 uses the print reference position 27a, which is stored in the storage unit 27, as basis for the printer 24 to execute printing.

Figure 3:
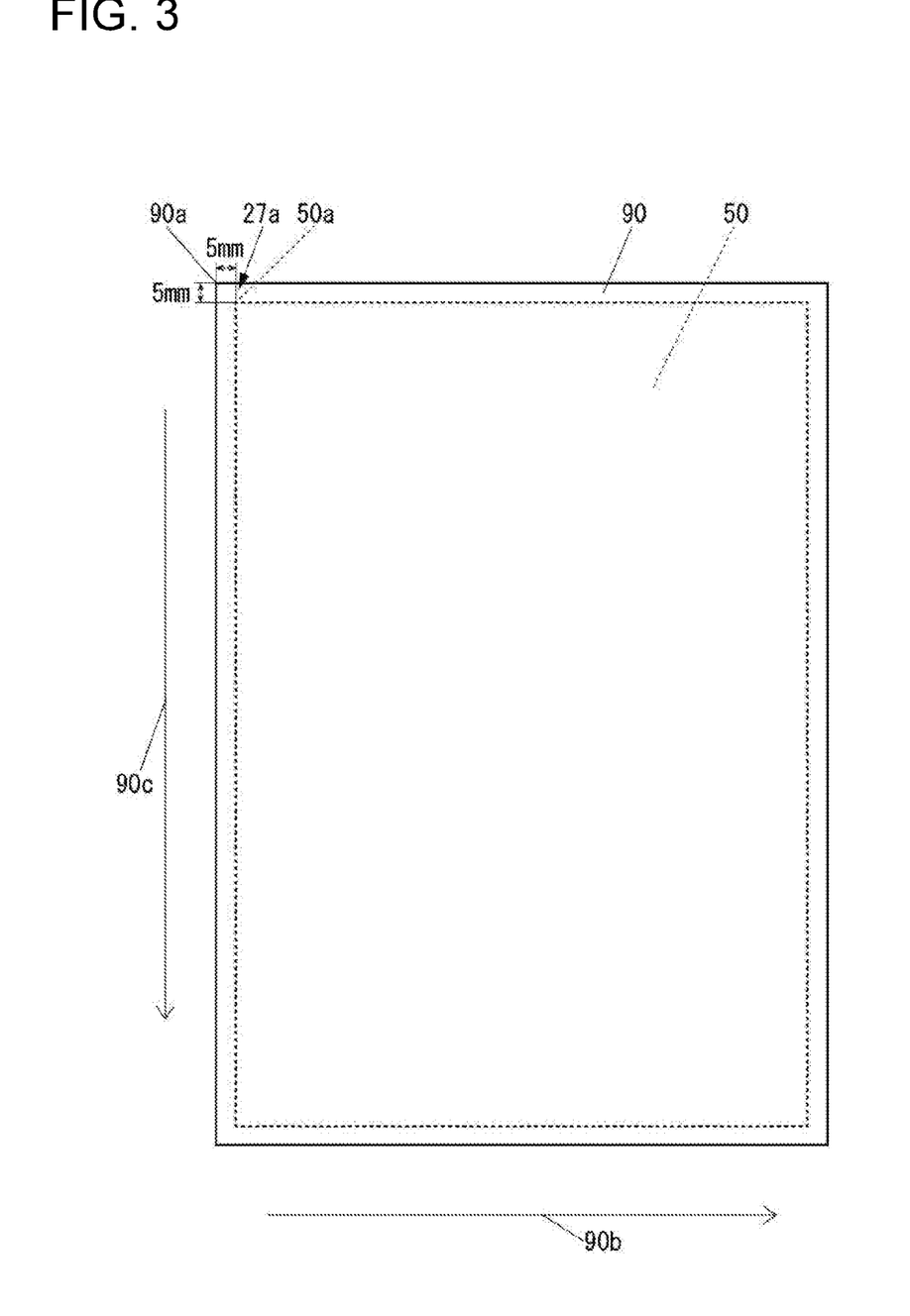
FIG. 3 illustrates an exemplary print reference position according to the embodiment.

FIG. 3 illustrates an exemplary print reference position 27a.

The print reference position 27a is a position of an origin 50a of a print area 50 printed on the recording medium 90 by the printer 24 (see FIG. 2), with respect to a reference of an origin 90a of a recording medium 90, as illustrated in FIG. 3. For example, in FIG. 3, assume that the origin 50a of the print area 50 is located at the position of: 5 mm from the origin 90a of the recording medium 90 in a direction indicated by an arrow 90b parallel to one side of the recording medium 90, and 5 mm from the origin 90a of the recording medium 90 in a direction indicated by an arrow 90c orthogonal to the direction indicated by the arrow 90b. Consequently, the print reference position 27a is (5, 5) in FIG. 3. For example, when the origin 50a of the print area 50 is 3 mm from the origin 90a of the recording medium 90 in the direction indicated by the arrow 90b, and 4 mm from the origin 90a of the recording medium 90 in the direction indicated by the arrow 90c, the print reference position 27a is (3, 4).

The printer 24 causes a displacement in print position due to an aged deterioration, such as abrasion in use for a long time, of its conveying member, which conveys a recording medium.

Figure 4:
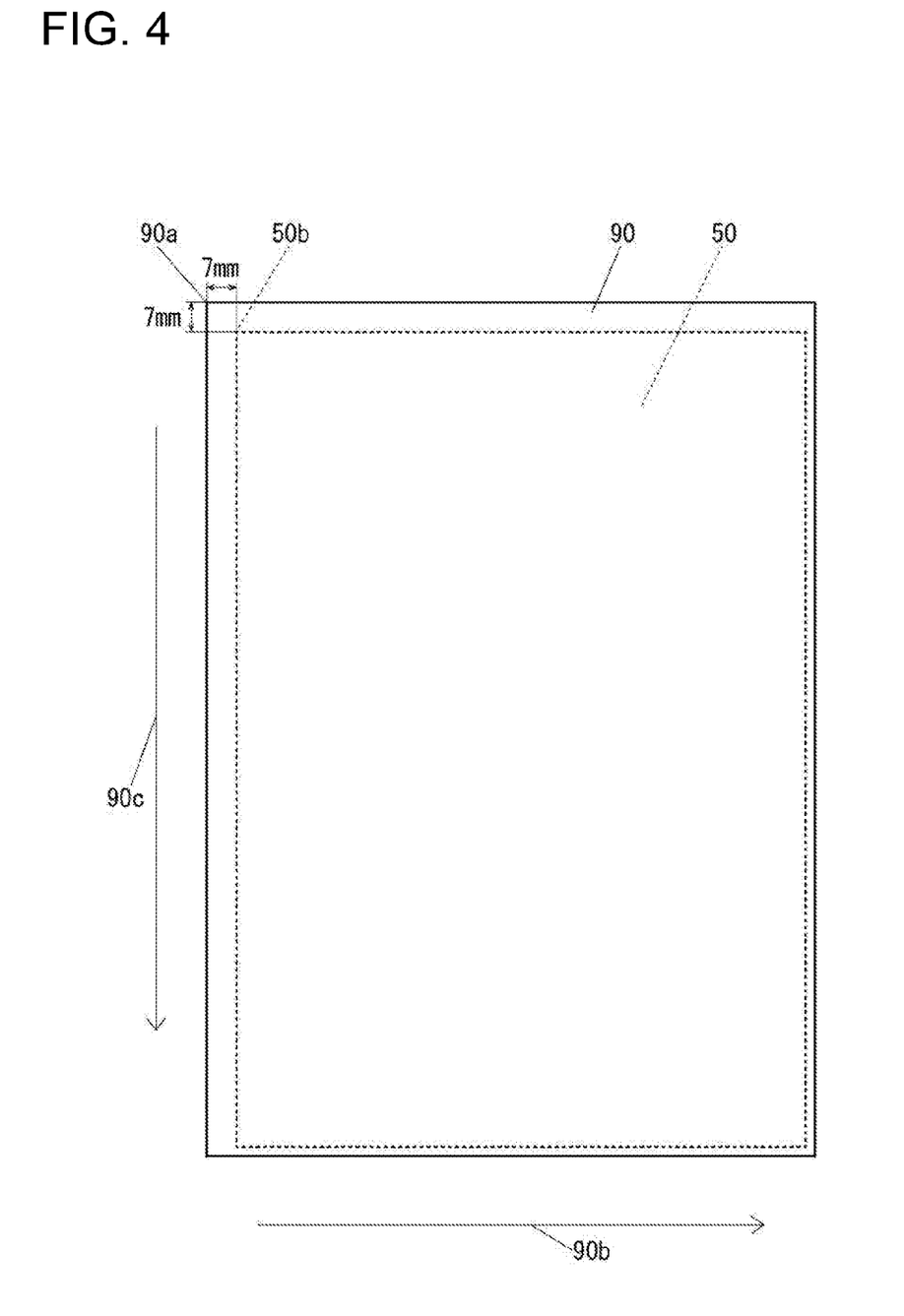
FIG. 4 illustrates an exemplary recording medium on which a printing has been executed by the MFP according to the embodiment with a print position displacement.

FIG. 4 illustrates an exemplary recording medium 90 on which a printing has been executed by the MFP 20 with a print position displacement, which is also referred to as displacement in image-forming-apparatus print position.

In FIG. 4, a position 50b is a position at which the MFP 20 prints on the recording medium 90 in response to an instruction of execution of printing at the origin 50a of the print area 50 (see FIG. 3). A printed reference position, which is also referred to as printing-complete reference position, as the position 50b as a position with respect to the origin 90a of the recording medium 90 is (7, 7). As the printed reference position illustrated in FIG. 4, (7, 7) is displaced from (5, 5) as the printed reference position 27a illustrated in FIG. 3.

Figure 5:
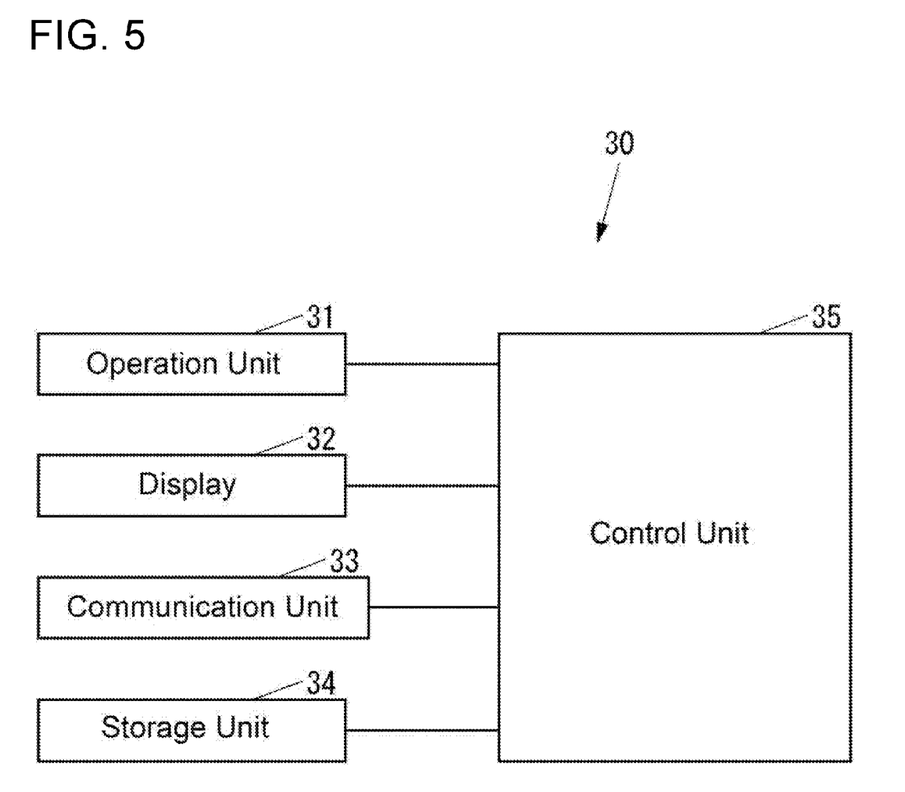
FIG. 5 illustrates a management server according to the embodiment.

FIG. 5 illustrates the management server 30.

The management server 30 includes an operation unit 31, a display 32, a communication unit 33, a storage unit 34, and a control unit 35 as illustrated in FIG. 5. The operation unit 31 is an input device such as a computer mouse or a keyboard, with which a user inputs various operations. The display 32 is a display device such as an LCD, which displays various pieces of information. The communication unit 33 is a network communication device that communicates with an external device via the network 11 (see FIG. 1). The storage unit 34 is a non-volatile storage device, which stores various information, such as an HDD. The control unit 35 controls the whole management server 30.

The control unit 35 includes, for example, a CPU, a ROM, and a RAM. The ROM stores programs and various data. The RAM is used as a work area of the CPU in the control unit 35 itself. The CPU in the control unit 35 executes programs stored in the storage unit 34 or the ROM in the control unit 35.

The management server 30 is a server for correcting a print position displacement of the MFP 20.

Figure 6:
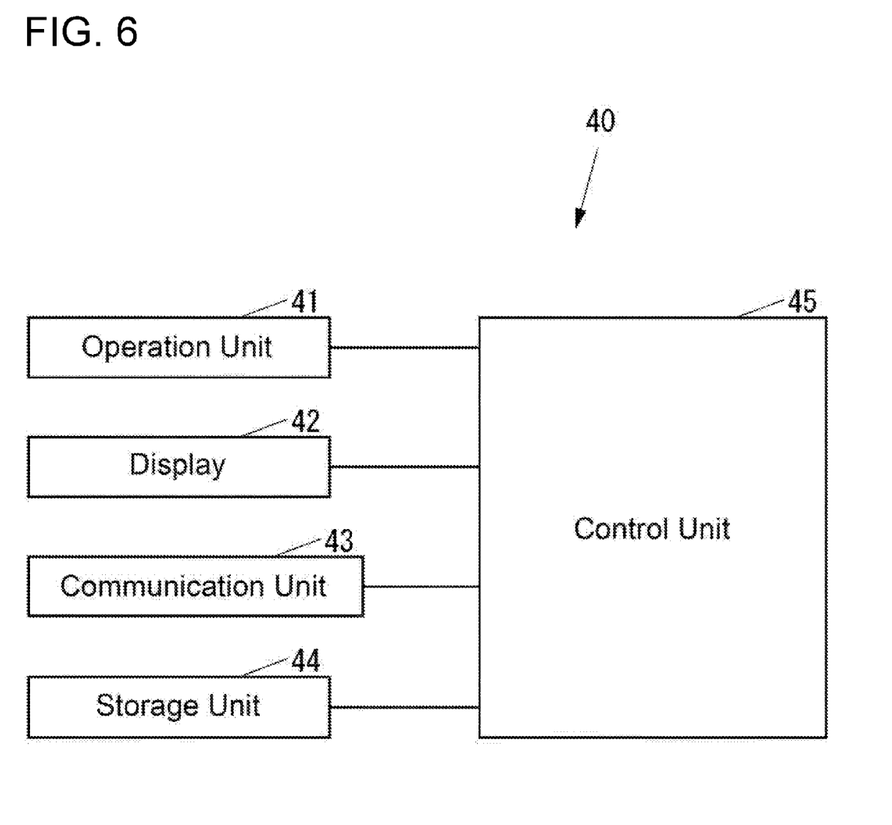
FIG. 6 illustrates a computer according to the embodiment.

FIG. 6 illustrates the computer 40.

The computer 40 includes an operation unit 41, a display 42, a communication unit 43, a storage unit 44, and a control unit 45 as illustrated FIG. 6. The operation unit 41 is an input device such as a computer mouse or a keyboard, with which a user inputs various operations. The display 42 is a display device such as an LCD, which displays various pieces of information. The communication unit 43 is a network communication device that communicates with an external device via the network 11 (see FIG. 1). The storage unit 44 is a non-volatile storage device, which stores various information, such as an HDD. The control unit 45 controls the whole computer 40.

The control unit 45 includes, for example, a CPU, a ROM, and a RAM. The ROM stores programs and various data. The RAM is used as a work area of the CPU in the control unit 45 itself. The CPU in the control unit 45 executes programs stored in the storage unit 44 or the ROM in the control unit 45.

Subsequently, the following describes an operation of the image forming system 10.

The following describes the MFP 20 representing the plurality of the MFPs included in the image forming system 10. The same applies to the MFPs other than the MFP 20.

Figure 7:
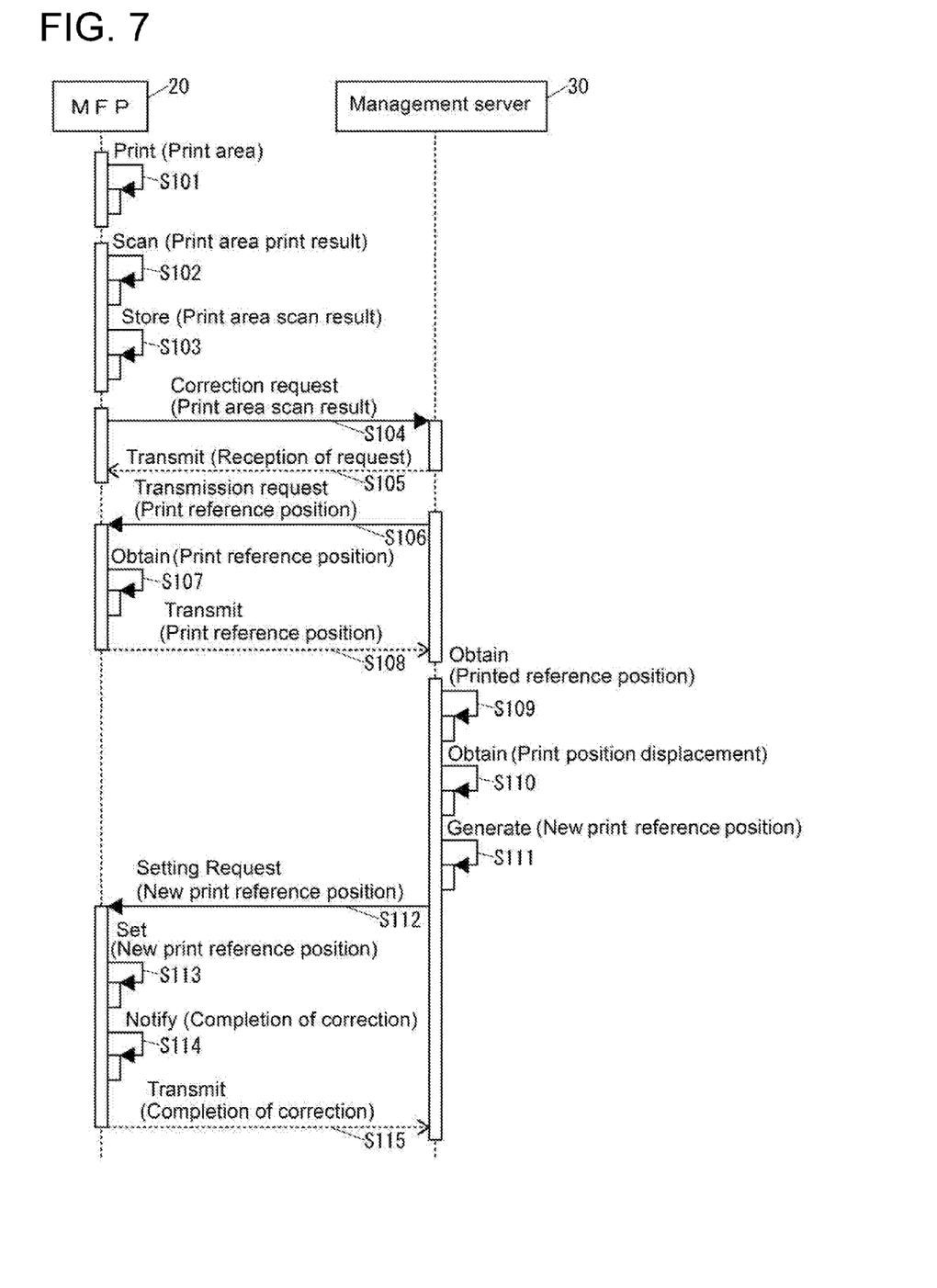
FIG. 7 illustrates an operation of the image forming system according to the embodiment when correcting the displacement of the print position of the MFP.

FIG. 7 illustrates an operation of the image forming system 10 when correcting the displacement of the print position of the MFP 20.

For example, when the user of the MFP 20 checks a printed matter printed by the MFP 20, and then finds a print position displacement of the MFP 20, the user is allowed to instruct the MFP 20 to print the print area 50 via the operation unit 21 in the MFP 20. Here, the instruction of printing the print area 50 includes an instruction of printing at the origin 50*a* of the print area 50.

When the control unit 28 in the MFP 20 is instructed to print the print area 50 via the operation unit 21, the printer 24 prints the print area 50 on the recording medium 90 as illustrated in FIG. 7 (Step S101).

Subsequently, the user of the MFP 20 instructs the MFP 20 to read an image from the recording medium 90, on which the print area 50 is printed at Step S101, via the operation unit 21 in the MFP 20.

Then, after the control unit 28 in the MFP 20 causes the scanner 23 to read the image from the recording medium 90, on which the print area 50 is printed at Step S101, (Step S102), the control unit 28 causes the storage unit 27 to store image data representing the image read at Step S102 (Step S103).

Subsequently, the user of the MFP 20 instructs the MFP 20 to request the management server 30 to correct the print position displacement of the MFP 20 via the operation unit 21 in the MFP 20.

The control unit 28 in the MFP 20 consequently requests the management server 30 to correct the print position displacement of the MFP 20 (Step S104). Here, the control unit 28 attaches the image data stored in the storage unit 27 at Step S103 to the request at Step S104.

After the control unit 35 in the management server 30 receives the request of correcting the print position displacement of the MFP 20 from the MFP 20, the control unit 35 notifies the MFP 20 of the reception of the request (Step S105), and then requests the MFP 20 to transmit the print reference position 27*a* of the MFP 20 prints (Step S106).

When the control unit 28 in the MFP 20 receives the request of transmitting the print reference position 27*a* of the MFP 20 from the management server 30, the control unit 28 obtains the print reference position 27*a* stored in the storage unit 27 (Step S107). Then, the control unit 28 transmits the print reference position 27*a* obtained at Step S107 to the management server 30 (Step S108).

When the control unit 35 in the management server 30 receives the print reference position 27*a* transmitted from the MFP 20 at Step S108, the control unit 35 obtains the printed reference position from the image data transmitted from the MFP 20 at Step S104 (Step S109).

After the process at Step S109, the control unit 35 obtains a displacement as a difference between the printed reference position obtained at Step S109, and the print reference position 27*a* transmitted from the MFP 20 at Step S108 (Step S110). For example, when the printed reference position is (7, 7) illustrated in FIG. 4, and the print reference position 27*a* is (5, 5) illustrated in FIG. 3, the control unit 35 obtain (2, 2) as the print position displacement.

The control unit 35 generates a new print reference position with respect to the displacement obtained at Step S110 after the process at Step S110 (Step S111). For example, when a present print reference position 27*a* is (5, 5) illustrated in FIG. 3, and the print position displacement is (2, 2), the control unit 35 subtracts the print position displacement from the present print reference position 27*a* to generate (3, 3) as the new print reference position.

After the process at Step S111, the control unit 35 requests the MFP 20 to set the new print reference position generated at Step S111 (Step S112).

After the control unit 28 in the MFP 20 receives the request of setting the new print reference position from the management server 30, the control unit 28 causes the storage unit 27 to store the received new print reference position as the print reference position 27*a* (Step S113). For example, the control unit 28 causes the storage unit 27 to store (3, 3) generated at Step S111 as the print reference position 27*a*.

After the process at Step S113, the control unit 28 notifies the user of the MFP 20 of a fact that a correction of the print reference position 27*a*, that is, a correction of the print position displacement is completed via the display 22 (Step S114). Various notification methods may be employed as a notification method. The notification method is, for example, an output with audio or a transmission of an e-mail to an e-mail address of the user of the MFP 20 in addition to the display at the display 22.

After the process at Step S114, the control unit 28 transmits information on a fact that "the correction of the print position displacement is completed" to the management server 30 (Step S115), and then terminates the operation illustrated in FIG. 7.

For example, when the print position displacement is (2, 2), the print reference position 27*a* is (5, 5) until the correction of the print position displacement is completed with the operation illustrated in FIG. 7. This causes the MFP 20 to print at a position of (7, 7), where (2, 2) of the print position displacement is add to (5, 5) as the print reference position 27*a*, in response to instruction of execution of printing at the print reference position 27*a*. When the correction of the print position displacement is completed with the operation illustrated in FIG. 7, however, the print position displacement is subtracted from the print reference position 27*a*, and the print reference position 27*a* becomes (3, 3). This causes the MFP 20 to print at the position of (5, 5), that is, the original print reference position 27*a*, where (2, 2) of the print position displacement is add to (3, 3) as the print reference position 27*a*, in response to instruction of execution of printing at the print reference position 27*a* is instructed.

After the termination of the operation illustrated in FIG. 7, the user of the MFP 20 instructs the MFP 20 to print the print area 50 via the operation unit 21, checks the printed matter printed by the MFP 20, and then determines existence of the print position displacement of the MFP 20. Then, when the user of the MFP 20 finds the print position displacement of the MFP 20, the user can cause the MFP 20 to execute the operation illustrated in FIG. 7 again.

The image forming system 10 has received the instructions from the user of the MFP 20 during the operation illustrated in FIG. 7 before the respective processes at Steps S101, S102, and S104. After the process at Step S101, the image forming system 10 may automatically continue the process at Step S102 without receiving the instruction from the user of the MFP 20. After the process at Step S103, the image forming system 10 may automatically continue the process at Step S104 without receiving the instruction from the user of the MFP 20.

The image forming system 10 automatically execute the respective processes at Step S105, Step S106, and Step S109 during the operation illustrated in FIG. 7. However, the image forming system 10 may have a configuration where upon the reception of the instruction by the management server 30 from the administrator via the operation unit 31 in the management server 30 or the operation unit 41 in the computer 40, the image forming system 10 continues the process at Step S105 after the process at Step S104. The image forming system 10 may include a configuration where upon the reception of the instruction by the management server 30 from the administrator via the operation unit 31 in the management server 30 or the operation unit 41 in the computer 40, the image forming system 10 executes the process at Step S106 or S109.

Figure 8:
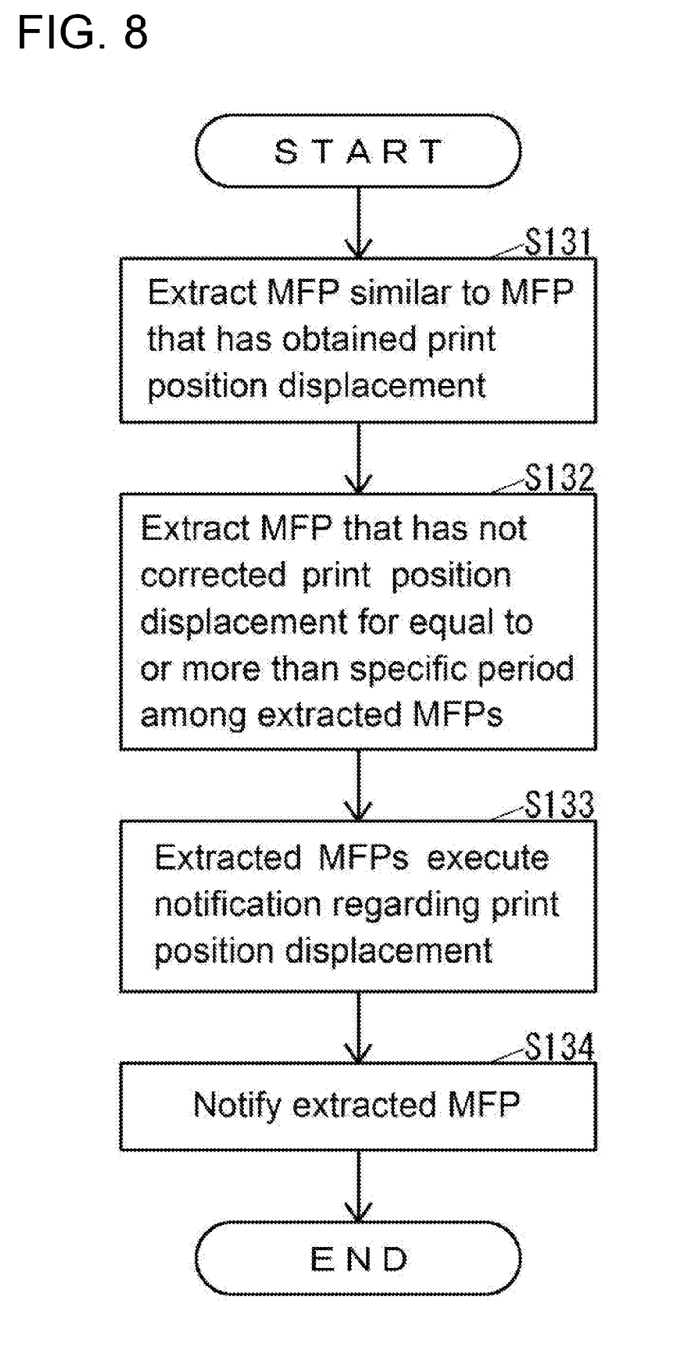
FIG. 8 illustrates an operation of the management server according to the embodiment when the management server notifies regarding an MFP that has not corrected a print position displacement for equal to or more than a specific period among MFPs similar to the MFP that has corrected a print position displacement.

FIG. 8 illustrates an operation of the management server 30 when the management server 30 notifies regarding an MFP that has not corrected a print position displacement for equal to or more than a specific period among MFPs similar to the MFP that has corrected the print position displacement with the operation illustrated in FIG. 7.

The control unit 35 in the management server 30 executes the operation illustrated in FIG. 8 to any of MFPs at a specific timing, such as a timing, at which the control unit 35 executes the operation illustrated in FIG. 7, and a periodic timing.

As illustrated in FIG. 8, the control unit 35 extracts an MFP similar, in view of the occurrence of the print position displacement, to the MFP that has obtained the print position displacement with the operation illustrated in FIG. 7, on the basis of a specific reference (Step S131).

Here, "similar in view of the occurrence of the print position displacement" means "similar to the extent that the occurrence of the print position displacement is predicted." Then, it is determined whether or not the MFP is "similar to the extent that the occurrence of the print position displacement is predicted" on the basis of the specific reference. The specific reference is, for example, a reference that "the MFPs are the identical model, and have printed the nearly-identical number of printed sheets to date." The present number of the printed sheets means the number of the printed sheets from the beginning if the MFP has never corrected the print position displacement. On the other hand, the present number of the printed sheets means the number of the printed sheets after the latest correction if the MFP had once corrected the print position displacement. The control unit 35 determines whether or not the present number of the printed sheets is nearly identical on the basis of the specific determination reference. When the plurality of the MFPs have the identical model and have printed the nearly-identical present number of the printed sheets, the plurality of the MFPs are predicted to cause a similar print position displacement to occur.

The specific reference may be a reference other than the reference that "the MFPs have the identical model and have printed the nearly-identical present number of the printed sheets."

The control unit 35 collects information necessary for the process at Step S131, for example, a model of the MFP and the number of the printed sheets from the MFP at a specific timing, such as a timing corresponding to the operation illustrated in FIG. 8 or a periodic timing unrelated to the operation illustrated in FIG. 8.

The control unit 35 extracts the MFP that has not corrected the print position displacement for equal to or more than the specific period with the operation illustrated in FIG. 7 among the MFPs extracted with the process at Step S131 after the process at Step S131 (Step S132).

After the process at Step S132, the control unit 35 executes a notification regarding the print position displacement of the MFP extracted with the process at Step S132 (Step S133). Specifically, the control unit 35 requests the MFP extracted with the process at Step S132 to execute the notification regarding the print position displacement.

When the control unit in the MFP is requested to execute the notification regarding the print position displacement with the process at Step S133, the display in the MFP itself executes the notification regarding the print position displacement. This allows a user of the MFP extracted with the process at Step S132 to execute the operation illustrated in FIG. 7 to the MFP extracted with the process at Step S132. Various notification methods may be employed as a notification method regarding the print position displacement. The notification method is, for example, an output with audio in addition to the display at the display in the MFP.

After the process at Step S133, the control unit 35 causes the display 32 or the display 42 in the computer 40 to notify the MFP extracted with the process at Step S132 (Step S134).

Then, after an administrator of the MFP extracted with the process at Step S132 confirms the notification on the display 32 in the management server 30 or the display 42 in the computer 40, the administrator executes the operation illustrated in FIG. 7 to the MFP extracted with the process at Step S132. Various notification methods may be employed as a notification method. The notification method is, for example, an output with audio in addition to the display at the display in the MFP.

The control unit 35 terminates the operation illustrated in FIG. 8 after the process at Step S134.

In the operation illustrated in FIG. 8, the control unit 35 in the management server 30 extracts the MFP that has not corrected the print position displacement for equal to or more than the specific period among the MFPs similar to the MFP that has corrected the print position displacement with the operation illustrated in FIG. 7 (Steps S131 to S132). However, the administrator may determine the MFP that has not corrected the print position displacement for equal to or more than the specific period among the MFPs similar to the MFP that has corrected the print position displacement with the operation illustrated in FIG. 7, on the basis of information managed by the management server 30. Subsequently, the administrator may execute the notification regarding the print position displacement to a user of the MFP that has not corrected the print position displacement for equal to or more than the specific period among the MFPs similar to the MFP that has corrected the print position displacement with the operation illustrated in FIG. 7.

Figure 9:
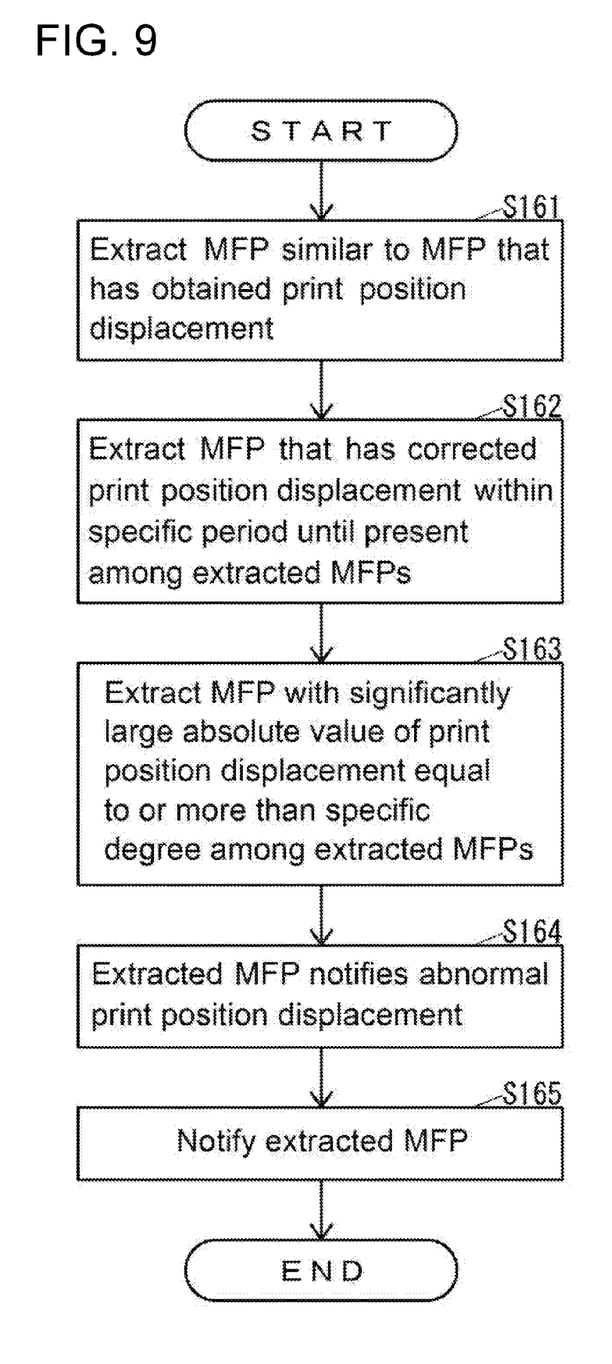
FIG. 9 illustrates an operation of the management server according to the embodiment when the management server notifies regarding an MFP with a significantly large absolute value of the print position displacement among a plurality of mutually similar MFPs that have corrected the print position displacement.

FIG. 9 illustrates an operation of the management server 30 when the management server 30 notifies an MFP with a significantly large absolute value of the print position displacement among a plurality of mutually similar MFPs that have corrected the print position displacement with the operation illustrated in FIG. 7.

The control unit 35 in the management server 30 executes the operation illustrated in FIG. 9 to any of MFPs at a specific timing, such as a timing, at which the control unit 35 executes the operation illustrated in FIG. 7, and a periodic timing.

As illustrated in FIG. 9, similarly to the process at Step S131 Illustrated in FIG. 8, the control unit 35 extracts an MFP similar, in view of the occurrence of the print position displacement, to the MFP that has obtained the print position displacement with the operation illustrated in FIG. 7, on the basis of the specific reference (Step S161).

Subsequently, the control unit 35 extracts the MFP that has corrected the print position displacement with the operation illustrated in FIG. 7 within a specific period until the present among the MFPs extracted with the process at Step S161 (Step S162).

Subsequently, the control unit 35 extracts an MFP with the significantly large absolute value, which is equal to or more than a specific degree, of the print position displacement among the MFPs extracted with the process at Step S162 (Step S163).

After the process at Step S163, the control unit 35 causes the MFP extracted with the process at Step S163 to notify an abnormal print position displacement (Step S164). Specifically, the control unit 35 requests the MFP extracted with the process at Step S163 to notify the abnormal print position displacement.

The control unit in the MFP, which is requested to notify the abnormal print position displacement at the process at Step S164, causes the display in the MFP itself to notify the abnormal print position displacement. Accordingly, a user of the MFP extracted with the process at Step S163 confirms the abnormal print position displacement of the MFP extracted with the process at Step S163 and can request, for example, an administrator of the MFP to dispatch a service person. Various notification methods may be employed as a method for notifying the abnormal print position displacement. The notification method is, for example, an output with audio in addition to the display at the display in the MFP.

After the process at Step S164, the control unit 35 causes the display 32 and the display 42 in the computer 40 to notify the MFP extracted with the process at Step S163 (Step S165).

Accordingly, the administrator of the MFP extracted with the process at Step S163 confirms the notification on the display 32 in the management server 30 or the display 42 in the computer 40, thus requesting dispatch of a service person for the MFP extracted with the process at Step S163. Various notification methods may be employed as a notification method. The notification method is, for example, an output with audio in addition to the display at the display in the MFP.

The control unit 35 terminates the operation illustrated in FIG. 9 after the process at Step S165.

In the operation illustrated in FIG. 9, the control unit 35 in the management server 30 extracts the MFP with the significantly large absolute value of the print position displacement among the plurality of the mutually similar MFPs that have corrected the print position displacement with the operation illustrated in FIG. 7 (Steps S161 to S163). However, the administrator may determine the MFP with the significantly large absolute value of the print position displacement among the plurality of the mutually similar MFPs that have corrected the print position displacement with the operation illustrated in FIG. 7, on the basis of the information managed by the management server 30. Subsequently, the administrator may notify a user, of the MFP with the significantly large absolute value of the print position displacement among the plurality of the mutually similar MFPs that have corrected the print position displacement with the operation illustrated in FIG. 7, of the abnormal print position displacement.

As described above, the image forming system 10 obtains the print position displacement of the MFP 20 from the management server 30 on the basis of the image read by the scanner 23 in the MFP 20 (Step S110). This ensures the reduced processing load of the MFP 20 for the correction of the print position displacement.

The image forming system 10 causes the management server 30 to generate a new print reference position, which is corrected on the basis of the print position displacement (Step S111). This ensures the reduced processing load of the MFP 20 for the correction of the print position displacement.

The image forming system 10 does not have to employ the management server 30 to generate the new print reference position, and employs the MFP 20 to generate the new print reference position.

The image forming system 10 causes the MFP similar, in view of the occurrence of the print position displacement, to the MFP that has corrected the print position displacement to execute the notification regarding the print position displacement (Step S133). This ensures the effective propose of the correction of the print position displacement to a user of the MFP similar, in view of the occurrence of the print position displacement, to the MFP that has corrected the print position displacement.

The image forming system 10 can notify the administrator of the MFP of the MFP similar, in view of the occurrence of the print position displacement, to the MFP that has corrected the print position displacement (Step S134). This ensures the effective propose of the correction of the print position displacement of the MFP similar, in view of the occurrence of the print position displacement, to the MFP that has corrected the print position displacement, to the administrator of the MFP.

The image forming system 10 notifies the administrator of the MFP of the MFP with a significantly large absolute value of the print position displacement among the plurality of the MFPs that have corrected the print position displacement, which are mutually similar in view of the occurrence of the print position displacement (Step S165). This causes the administrator of the MFP to observe the abnormal print position displacement.

The image forming system 10 causes the MFP with the significantly large absolute value of the print position displacement among the plurality of the MFPs that have corrected the print position displacement, which are mutually similar in view of the occurrence of the print position displacement, to notify the abnormal print position displacement (Step S164). This causes the user of the MFP that prints at the abnormal print position displacement to observe the abnormal print position displacement printed by the MFP.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming system comprising:
   a multifunction peripheral that includes
      a printer that prints on a recording medium,
      a scanner that reads image from the recording medium, and
      a storage that stores a print reference position as an origin of a print area with respect to a recording-medium origin on a recording medium on which the printer prints, the multifunction peripheral causing the printer to execute printing with respect to the print reference position stored in the storage; and
   a server that corrects displacement in image-forming-apparatus print position; wherein
   the multifunction peripheral transmits to the server image data representing an image, and the image is read by the scanner from the recording medium on which the printer prints the image, in response to an instruction to print at the origin of the print area;

the server
acquires, from the image data transmitted from the multifunction peripheral, a printing-complete reference position, as a position where the recording-medium origin is made a reference, in a location printed on the recording medium by the multifunction peripheral in response to an instruction to execute printing at the print-area origin,
acquires the displacement as a difference between the acquired printing-complete reference position and the print reference position stored in the storage, and
corrects the print reference position based on the displacement, to generate the new print reference position, and transmits the generated new print reference position to the multifunction peripheral; and
the multifunction peripheral causes the storage to store the new print reference position corrected based on the displacement, and transmitted from the server.

2. An image forming system comprising:
a multifunction peripheral that includes
a printer that prints on a recording medium,
a scanner that reads image from the recording medium, and
a storage that stores a print reference position as an origin of a print area with respect to a recording-medium origin on a recording medium on which the printer prints, the multifunction peripheral causing the printer to execute printing with respect to the print reference position stored in the storage; and
a server that corrects displacement in image-forming-apparatus print position; wherein
the multifunction peripheral transmits to the server image data representing an image, and the image is read by the scanner from the recording medium on which the printer prints the image, in response to an instruction to print at the origin of the print area;
the server
acquires, from the image data transmitted from the multifunction peripheral, a printing-complete reference position, as a position where the recording-medium origin is made a reference, in a location printed on the recording medium by the multifunction peripheral in response to an instruction to execute printing at the print-area origin,
acquires the displacement as a difference between the acquired printing-complete reference position and the print reference position stored in the storage, and
extracts, based on a specific reference, a multifunction peripheral similar to the multifunction peripheral that has obtained the displacement in view of occurrence of the displacement, and the similar multifunction peripheral executes a notification regarding the displacement; and
the multifunction peripheral causes the storage to store a new print reference position corrected based on the displacement.

3. An image forming system comprising:
a multifunction peripheral that includes
a printer that prints on a recording medium,
a scanner that reads image from the recording medium, and
a storage that stores a print reference position as an origin of a print area with respect to a recording-medium origin on a recording medium on which the printer prints, the multifunction peripheral causing the printer to execute printing with respect to the print reference position stored in the storage; and
a server that corrects displacement in image-forming-apparatus print position; wherein
the multifunction peripheral transmits to the server image data representing an image, and the image is read by the scanner from the recording medium on which the printer prints the image, in response to an instruction to print at the origin of the print area;
the server
acquires, from the image data transmitted from the multifunction peripheral, a printing-complete reference position, as a position where the recording-medium origin is made a reference, in a location printed on the recording medium by the multifunction peripheral in response to an instruction to execute printing at the print-area origin,
acquires the displacement as a difference between the acquired printing-complete reference position and the print reference position stored in the storage, and
extracts, based on a specific reference, a multifunction peripheral similar to the multifunction peripheral that has obtained the displacement in view of occurrence of the displacement, and notifies the similar multifunction peripheral; and
the multifunction peripheral causes the storage to store a new print reference position corrected based on the displacement.

4. An image forming system comprising:
a multifunction peripheral that includes
a printer that prints on a recording medium,
a scanner that reads image from the recording medium, and
a storage that stores a print reference position as an origin of a print area with respect to a recording-medium origin on a recording medium on which the printer prints, said multifunction peripheral causing the printer to execute printing with respect to the print reference position stored in the storage; and
a server that corrects displacement in image-forming-apparatus print position; wherein
said multifunction peripheral transmits to the server image data representing an image, and the image is read by the scanner from the recording medium on which the printer prints the image, in response to an instruction to print at the origin of the print area;
the server
acquires, from the image data transmitted from said multifunction peripheral, a printing-complete reference position, as a position where the recording-medium origin is made a reference, in a location printed on the recording medium by said multifunction peripheral in response to an instruction to execute printing at the print-area origin,
acquires the displacement as a difference between the acquired printing-complete reference position and the print reference position stored in the storage,
determines, based on a specific reference, a plurality of multifunction peripherals, among the plurality of the multifunction peripherals for which the displacement has been obtained, that are similar to each other in that the displacement has been generated,
extracts the multifunction peripheral with a markedly large absolute value of the displacement from the plurality of the mutually similar multifunction peripherals, and
notifies the multifunction peripheral with the markedly large absolute value of the displacement, the markedly large absolute value being an absolute value markedly larger by equal to or more than a specific degree; and said multifunction peripheral causes the storage to store a new print reference position corrected based on the displacement.

5. An image forming system comprising:
a multifunction peripheral that includes
   a printer that prints on a recording medium,
   a scanner that reads image from the recording medium, and
   a storage that stores a print reference position as an origin of a print area with respect to a recording-medium origin on a recording medium on which the printer prints, said multifunction peripheral causing the printer to execute printing with respect to the print reference position stored in the storage; and
a server that corrects displacement in image-forming-apparatus print position; wherein
said multifunction peripheral transmits to the server image data representing an image, and the image is read by the scanner from the recording medium on which the printer prints the image, in response to an instruction to print at the origin of the print area;
the server
   acquires, from the image data transmitted from said multifunction peripheral, a printing-complete reference position, as a position where the recording-medium origin is made a reference, in a location printed on the recording medium by said multifunction peripheral in response to an instruction to execute printing at the print-area origin,
   acquires the displacement as a difference between the acquired printing-complete reference position and the print reference position stored in the storage,
   determines, based on a specific reference, a plurality of multifunction peripherals, among the plurality of the multifunction peripherals for which the displacement has been obtained, that are similar to each other in that the displacement has been generated, and
   extracts the multifunction peripheral with a markedly large absolute value of the displacement from the plurality of the mutually similar multifunction peripherals, the multifunction peripheral with the markedly large absolute value of the displacement reporting the fact of the displacement being abnormal, and the markedly large absolute value being an absolute value markedly larger by equal to or more than a specific degree; and
said multifunction peripheral causes the storage to store a new print reference position corrected based on the displacement.

6. An image forming method by an image forming system, wherein the image forming system includes
   multifunction peripheral having
   a printer that prints on a recording medium,
   a scanner that reads image from the recording medium, and
   a storage that stores a print reference position as an origin of a print area with respect to a recording-medium origin on a recording medium on which the printer prints, and
   a server that corrects displacement in image-forming-apparatus print position; the image forming method comprising:

the multifunction peripheral causing the printer to execute printing with respect to the print reference position stored in the storage;
the multifunction peripheral transmitting to the server image data representing an image;
the image being read by the scanner from the recording medium on which the printer prints the image, in response to an instruction to print at the origin of the print area;
the server
   acquiring, from the image data transmitted from the multifunction peripheral, a printing-complete reference position, as a position where the recording-medium origin is made a reference, in a location printed on the recording medium by the multifunction peripheral in response to an instruction to execute printing at the print-area origin,
   acquiring the displacement as a difference between the acquired printing-complete reference position and the print reference position stored in the storage, and
   correcting the print reference position based on the displacement, to generate the new print reference position, and transmitting the generated new print reference position to the multifunction peripheral; and
the multifunction peripheral causing the storage to store the new print reference position corrected based on the displacement, and transmitted from the server.

7. The image forming method according to claim 6, wherein the server extracts, based on a specific reference, a multifunction peripheral similar to the multifunction peripheral that has obtained the displacement in view of occurrence of the displacement, and the similar multifunction peripheral executes a notification regarding the displacement.

8. The image forming method according to claim 6, wherein the server extracts, based on a specific reference, a multifunction peripheral similar to the multifunction peripheral that has obtained the displacement in view of occurrence of the displacement, and notifies the similar multifunction peripheral.

9. The image forming method according to claim 6, wherein the server:
   determines, based on a specific reference, a plurality of multifunction peripherals, among the plurality of the multifunction peripherals for which the displacement has been obtained, that are similar to each other in that the displacement has been generated;
   extracts the multifunction peripheral with a markedly large absolute value of the displacement from the plurality of the mutually similar multifunction peripherals; and
   notifies the multifunction peripheral with the markedly large absolute value of the displacement, the markedly large absolute value being an absolute value markedly larger by equal to or more than a specific degree.

10. The image forming method according to claim 6, wherein the server:
   determines, based on a specific reference, a plurality of multifunction peripherals, among the plurality of the multifunction peripherals for which the displacement has been obtained, that are similar to each other in that the displacement has been generated; and
   extracts the multifunction peripheral with a markedly large absolute value of the displacement from the plurality of the mutually similar multifunction peripherals, the multifunction peripheral with the markedly large absolute value of the displacement reporting the fact of the displacement being abnormal, and the markedly large absolute value being an absolute value markedly larger by equal to or more than a specific degree.

\* \* \* \* \*